United States Patent [19]
Fueki

[11] Patent Number: 5,500,930
[45] Date of Patent: Mar. 19, 1996

[54] SYSTEM TO DECODE INSTRUCTIONS INDICATING THE ADDRESSES OF CONTROL CODES AND PROVIDING PATTERNS TO DIRECT AN ELECTRON BEAM EXPOSURE APPARATUS

[75] Inventor: Shunsuke Fueki, Yokohama, Japan

[73] Assignee: Fujitsu Limited, Kawasaki, Japan

[21] Appl. No.: 194,802

[22] Filed: Feb. 14, 1994

Related U.S. Application Data

[63] Continuation of Ser. No. 431,896, Nov. 6, 1989, abandoned.

[30] Foreign Application Priority Data

Nov. 4, 1988 [JP] Japan .................. 63-279606

[51] Int. Cl.$^6$ .................. G06F 3/00; G06F 9/312; G06F 19/00
[52] U.S. Cl. .................. 395/141; 395/421.05; 395/421.08; 395/421.11; 250/492.22; 364/251.1; 364/251.3; 364/DIG. 2
[58] Field of Search .................. 395/425, 400, 395/141, 421.05, 421.07, 421.08, 421.11; 364/488, 491, 518, 251, 251.1, 254.3; 360/48; 369/47; 250/492.2, 492.3

[56] References Cited

U.S. PATENT DOCUMENTS

| | | | |
|---|---|---|---|
| 3,675,212 | 7/1972 | Raviv et al. | 341/67 |
| 4,032,896 | 6/1977 | Bennett et al. | 395/400 |
| 4,079,455 | 3/1978 | Ozga | 395/800 |
| 4,188,669 | 2/1980 | Rauscher | 395/375 |
| 4,195,339 | 3/1980 | Smith et al. | 395/775 |
| 4,280,186 | 7/1981 | Hidai et al. | 395/141 |
| 4,387,433 | 6/1983 | Cardenia et al. | 364/491 |
| 4,532,598 | 7/1985 | Shibayama et al. | 364/491 |
| 4,601,009 | 7/1986 | Kogawa et al. | 395/425 |
| 4,633,390 | 12/1986 | Yoshida | 395/425 |
| 4,780,808 | 10/1988 | Moreno et al. | 395/800 |
| 4,787,065 | 11/1988 | Barazesh et al. | 395/425 |
| 4,805,094 | 2/1989 | Oye et al. | 395/250 |
| 4,932,014 | 6/1990 | Tamiya | 369/48 |
| 4,975,835 | 12/1990 | Hidaka et al. | 395/650 |
| 5,034,914 | 7/1991 | Osterlund | 395/425 |
| 5,046,040 | 9/1991 | Miyoshi | 395/375 |
| 5,115,490 | 5/1992 | Komuro et al. | 395/400 |

FOREIGN PATENT DOCUMENTS

| | | |
|---|---|---|
| 0159364 | 10/1985 | European Pat. Off. . |
| 0217358 | 8/1987 | European Pat. Off. . |

OTHER PUBLICATIONS

Gallagher, J. G., "System for Redundant Micro–Instructions," *IBM Technical Disclosure Bulletin*, vol. 14, No. 5, Oct. 1971, pp. 1141, 1411–1412.

*Primary Examiner*—Thomas G. Black
*Assistant Examiner*—Jack M. Choules
*Attorney, Agent, or Firm*—Staas & Halsey

[57] ABSTRACT

A decoder to decode input data which includes an instruction code. The decoder includes a high-order address generator which uses the instruction code in the generation of the high-order address, and a storage circuit which stores control codes that corresponded to the instruction code. Indication data is stored in the beginning or end of the storage area to indicate the number of control codes present in the storage area. The address generated by the high-order address generator locates the desired control codes. A low-order address generator uses the indication data to count the number of control codes and derive a low-order address offset from the high order address. An internal address generator generates an internal address from a combination of the high-order and low-order addresses. The internal address is supplied to the storage circuit serially read out the control codes as the internal address is continuously incremented. The decoded input data is used in the generation of a pattern and to control an electron beam which exposes a wafer.

31 Claims, 10 Drawing Sheets

SYSTEM TO DECODE INSTRUCTIONS INDICATING THE ADDRESSES OF CONTROL CODES AND PROVIDING PATTERNS TO DIRECT AN ELECTRON BEAM EXPOSURE APPARATUS

This application is a continuation of application Ser. No. 07/431,896, filed Nov. 6, 1989, now abandoned.

BACKGROUND OF THE INVENTION

The present invention generally relates to a device for decoding an instruction code, and more particularly to a device which decodes an instruction code to thereby generate data which can be applied to an apparatus such as an electron beam exposure apparatus. Further, the present invention is directed to a decode device which can continuously generate a series of extended data corresponding to an instruction code. The present invention is suitable for a decode device which supplies an electron beam exposure device with exposure data.

Figure 1:
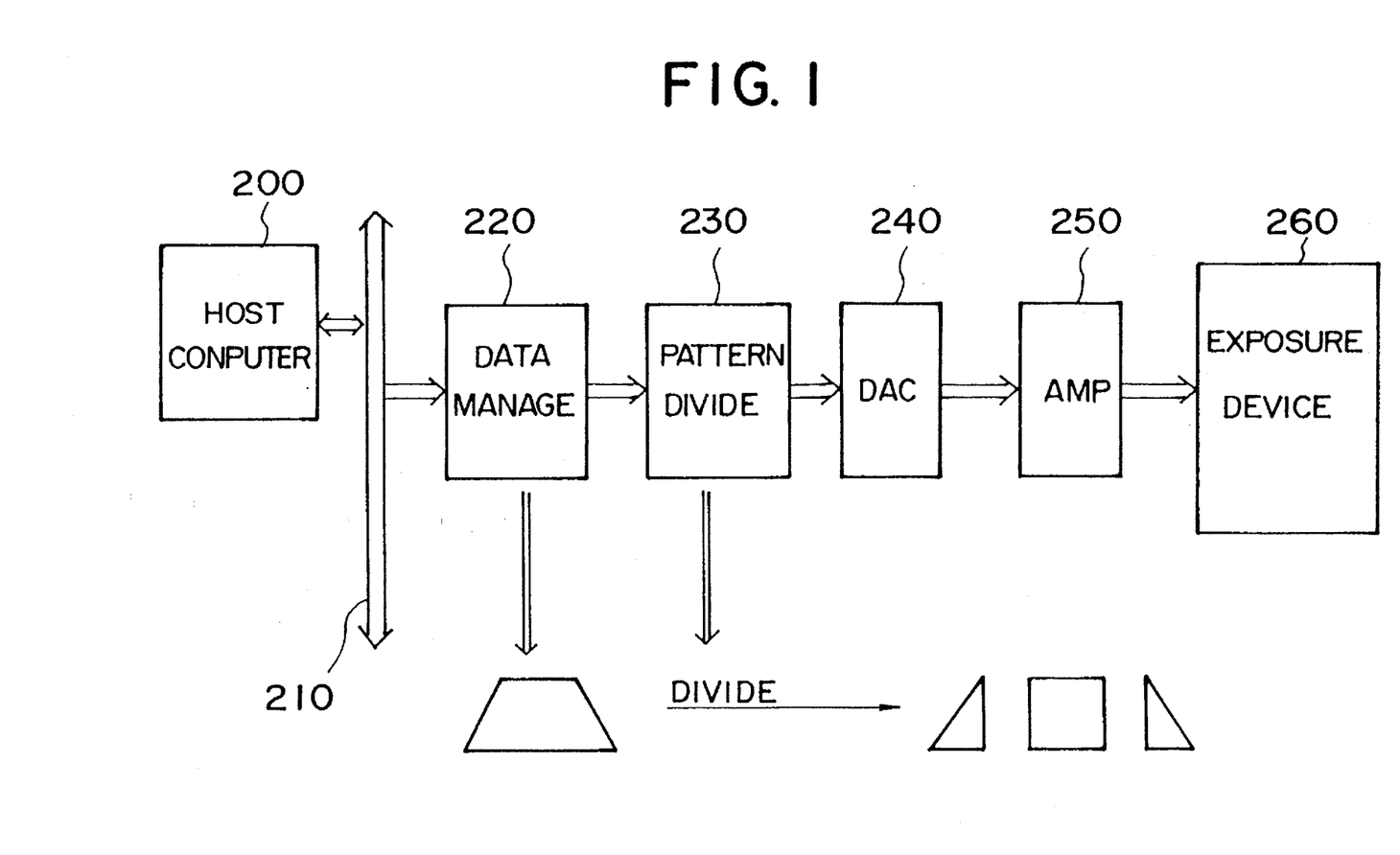
FIG. 1 is a block diagram of an electron beam exposure apparatus.

Referring to FIG. 1, there is illustrated an electron beam exposure apparatus. The illustrated electron beam exposure apparatus is made up of a host computer 200, a bus 210, a data management device 220, a segmented pattern generator 230, a digital-to-analog converter 240, an amplifier 250 and an electron beam exposure device 260. The host computer 200 supplies the data management device 220 with input data, which includes an instruction code which indicates the shape of a pattern to be drawn, a starting point of exposure and the size of the pattern. The input data cannot be applied directly to the exposure device 260, since it draws a pattern on a wafer by repeatedly projecting a variable rectangular shaped beam having a limited size. For this reason, the segmented pattern generator 230 divides the input pattern supplied from the data management device 220 into pattern segments. The data relating to the pattern segments in digital form is converted into a corresponding analog signal through the D/A converter 240. The converted analog signal is amplified through the amplifier 250, and supplied to the exposure device 260.

Figure 2:
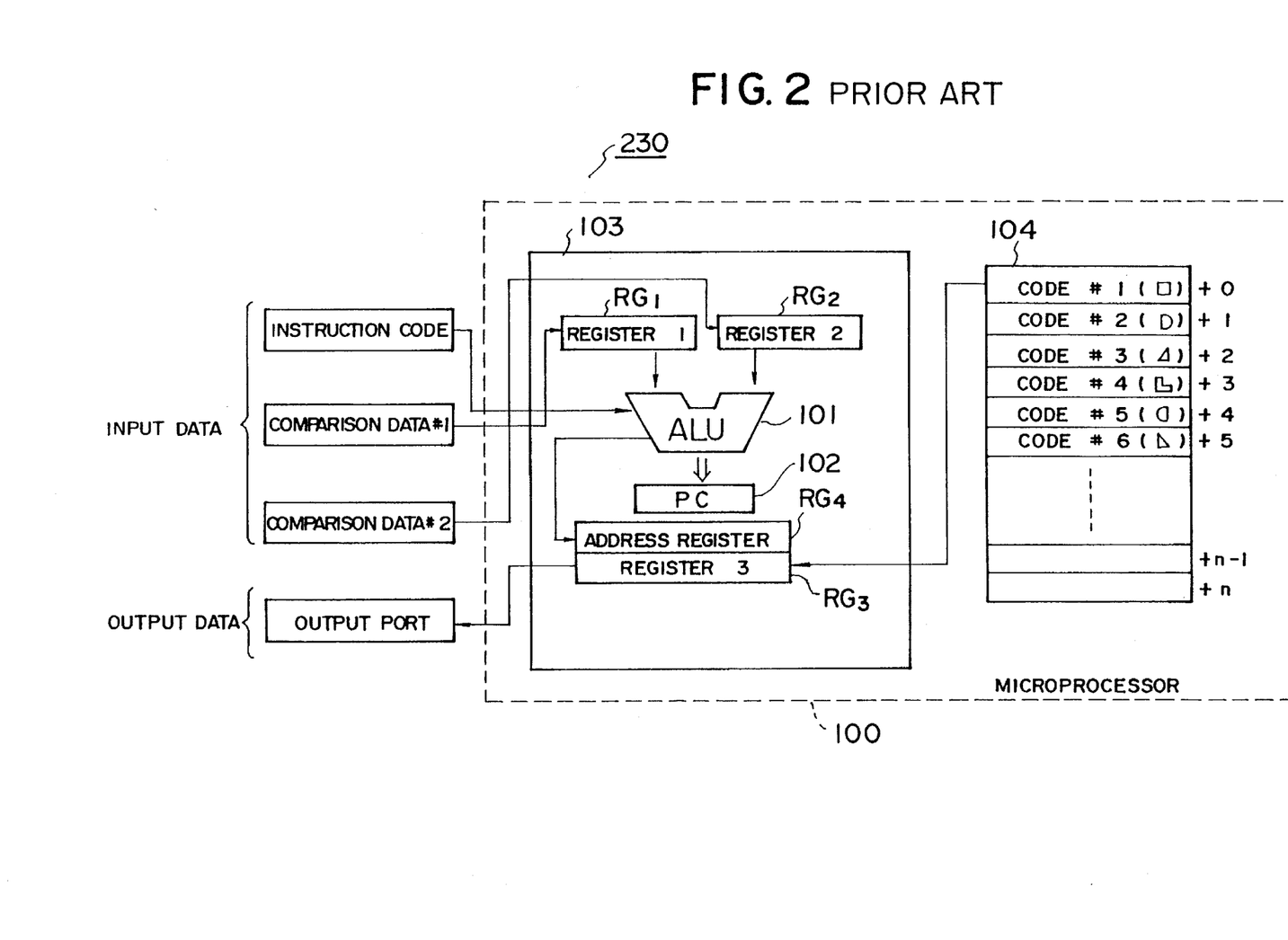
FIG. 2 is a block diagram of a segmented pattern generator shown in FIG. 1.

FIG. 2 is a block diagram of the segmented pattern generator 230 which serves as a decoder. The segmented pattern generator 230 includes a microprocessor 100, which is composed of an operation/comparison circuit 103 and a memory 104. The operation/comparison circuit 103 includes a plurality of registers such as registers RG1, RG2, RG3 and RG4 (only four registers are illustrated for the sake of simplicity), an arithmetic and logic unit (hereinafter simply referred to ALU) 101, and a program counter (PC) 102. The memory 104 stores a plurality of control codes (extended data), which are necessary for an exposure procedure and has a data form which can be executed by the exposure device 260.

Figure 3:
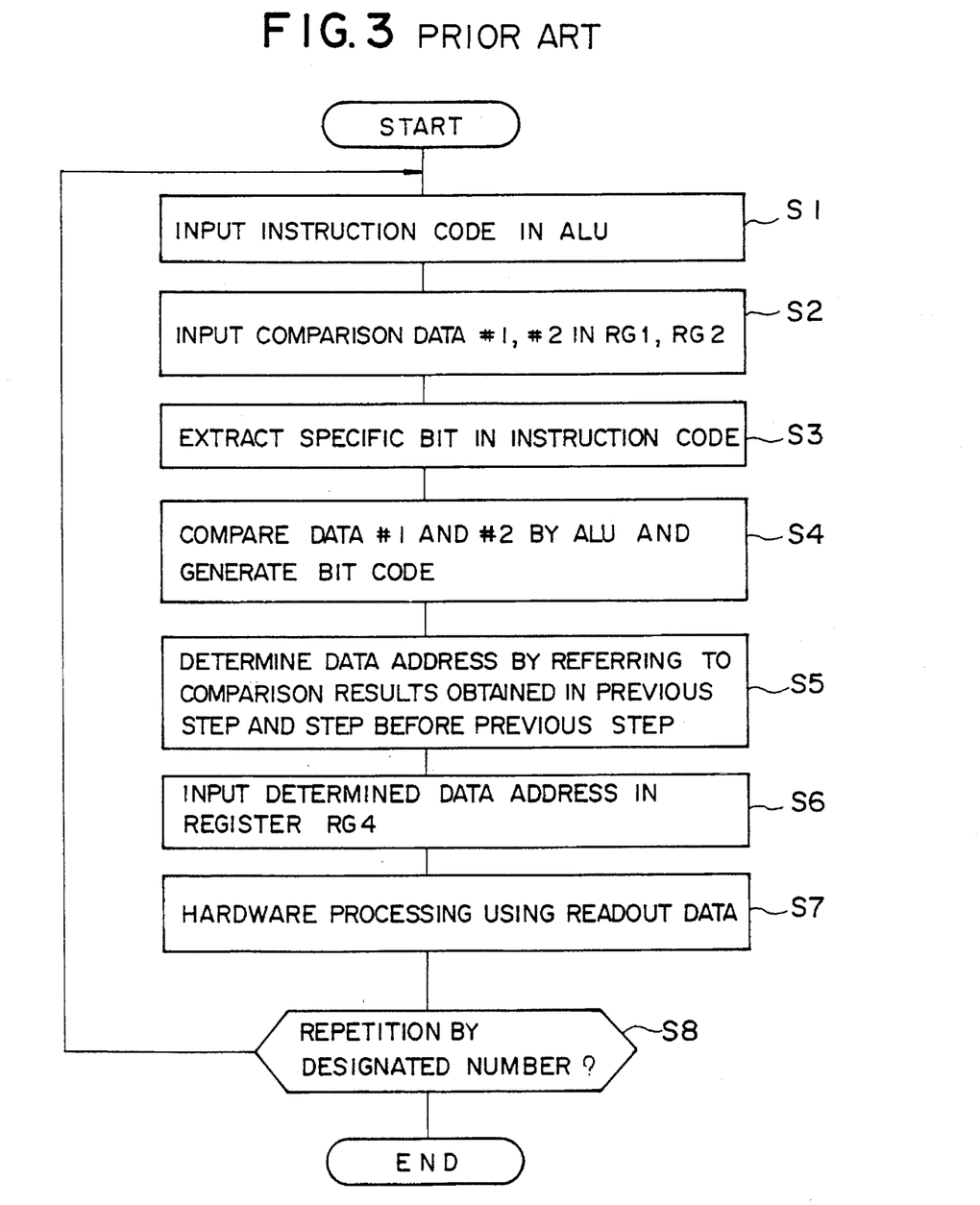
FIG. 3 is a flowchart of a procedure for decoding an instruction code to thereby generate a series of extended data (control codes)

FIG. 3 is a flowchart of an operation of the microprocessor 100 shown in FIG. 2. Referring to FIGS. 2 and 3, the operation/comparison circuit 103 is supplied with an instruction code indicating the shape of a pattern to be drawn, for example (step S1). The instruction code is one of the input data supplied from the data management circuit 220. Next, comparison data #1 and #2 are written in the registers RG1 and RG2 (step S2). The comparison data #1 and #2 are some of the input data supplied from the data management circuit 220, and include the exposure starting point and the size of the pattern to be drawn, for example. Then the ALU 101 extracts a specific bit (bits) contained in the instruction code therefrom (step S3). After that, the ALU 101 inputs the comparison data #1 and #2 from the registers RG1 and RG2, and compares them to thereby generate a bit code indicative of the comparison result (step S4). The generated bit code is supplied to the program counter 102, which determines the address of a data storage area of the memory 104 to be accessed in which data (control code) for calculating extended data is stored, by referring to the bit codes obtained in the just previous step and the step before the previous step (step S5). The process in step S5 is executed by a microprogram provided in the microprocessor 100, which is controlled by the program counter 102. The address calculated in step S5 is stored in the register RG4, which serves as an address register. The address in the register RG4 is supplied to the memory 104, which outputs the contents of the data storage area (control code) designated by the supplied address. The readout control code is temporarily stored in the register RG3 (step S6), and is then supplied to an external hardware device (not shown). Then the external hardware device executes a process corresponding to the control code. When the corresponding process is completed, the procedure returns to step S1. The sequence of steps S1 to S7 is repeatedly carried out a designated number of times that this sequence is to be repeatedly executed (S8).

It is now assumed that a trapezoid depicted in FIG. 1 is divided into three pattern segments labeled P1, P2 and P3, and that control codes (extended data) #3, #1 and #6 shown in FIG. 2 relate to the pattern segments P1, P2 and P3, respectively. First, address '2' is calculated and written in the address register RG4 by the ALU 101 using input data containing the instruction code and the comparison data #1 and #2 relating to the input data of the trapezoid. The corresponding control code #3 is read out from the memory 104, and supplied to the external hardware device through the register RG3 and an output port. Second, address '0' is calculated and stored in the address register RG4 by the ALU 101 using the input data. The corresponding control code #1 is read out from the memory 104, and supplied to the external hardware device. Third, address '5' is written in the address register RG4 by the ALU 101 using the input data. The corresponding control code #6 is read out from the memory 104, and supplied to the external hardware device.

The control codes (extended data) thus formed are supplied to the exposure device 260 (FIG. 1) through the D/A converter 240 and the amplifier 250.

However, the aforementioned conventional decoder has the following disadvantages. The microprocessor serving as the decoder is controlled by the microprogram addressed by the program counter 102. In case where a large number of decision making conditions is required for the comparison procedure in step S4, the operation executing cycle increases and thus it takes a long time to obtain the bit code indicative of the comparison result. In addition, the comparison data #1 and #2 must be transferred via the registers RG1 and RG2 and an accumulator (not shown for the sake of simplicity) provided in the operation/comparison circuit 103. Thus, the memory access is delayed.

SUMMARY OF THE INVENTION

Accordingly, a general object of the present invention is to provide a novel and useful decoder in which the aforementioned disadvantages are eliminated.

A more specific object of the present invention is to provide a decoder capable of continuously generating a series of extended data (control codes) by an applied specific instruction code.

The above-mentioned objects of the present invention are achieved by a decoder comprising first address generating means for generating a first address from input data including an instruction code, and storage means having storage areas, for storing a plurality of control codes corresponding to the instruction code and indication data indicating the number of the plurality of control codes in the storage areas, The indication data is stored in the one of the beginning and end storage areas among the storage areas. The one of the beginning and end storage areas is indicated by the first address generated by the first address generating means. The decoder further comprises second address generating means, coupled to the storage means, for counting up or down to the number of control codes indicated by the indication data to thereby generate a second address, and internal address generating means for generating an internal address to be supplied to the storage means by combining the first and second addresses. The plurality of control codes are serially read out from the storage means in accordance with the internal address in which the second address is continuously incremented or decremented.

The aforementioned objects of the present invention are also be achieved by a decoder comprising first address generating means for generating a first address from input data including an instruction code, and first storage means having storage areas, for storing a plurality of control codes corresponding to the instruction code and indication data indicating the number of the plurality of control codes in the storage areas. The indication data is stored in the one of the beginning and end storage areas among the storage areas. The one of the beginning and end storage areas is indicated by the first address supplied from the first address generating means. The decoder further comprises second storage means for storing the plurality of control codes and the indication code to be transferred to the first storage means, second address generating means, coupled to the first storage means, for counting up or down to the number of control codes indicated by the indication data to thereby generate a second address, the first address and the second address forming a first internal address, internal address generating means for generating a second internal address signal which is to be supplied to the first and second storage means, and selecting means for selecting one of the first and second internal addresses, selected one of the first and second internal addresses being supplied to the first storage means. The plurality of control codes are serially read out from the first storage means in accordance with the first internal address in which the second address is continuously incremented or decremented.

Additional objects, features and advantages of the present invention will become apparent from the following detailed description when read in conjunction with the accompanying drawings.

DESCRIPTION OF THE PREFERRED EMBODIMENTS

Figure 4:
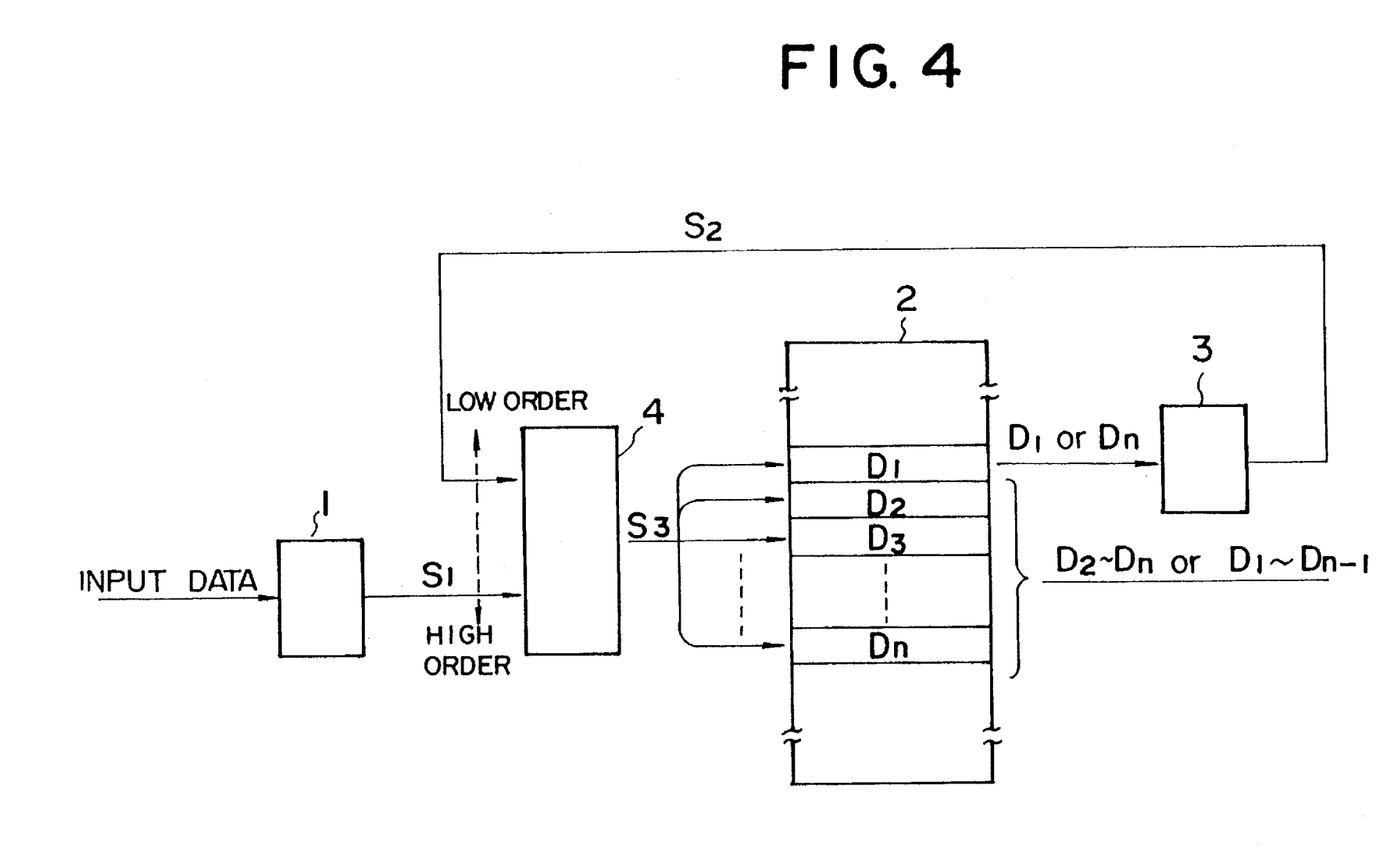
FIG. 4 is a block diagram illustrating the principle of the present invention.

A description is given of the principle of the present invention with reference to FIG. 4. The decoder according to the present invention includes a high-order address generator 1, a storage circuit 2, a low-order address generator 3, and an internal address generator 4. The high-order address generator 1 generates a high-order address signal S1 of an internal address signal S3 by referring to an input data including a specific instruction code. The internal address signal S3 is output from the internal address generator 4. The storage circuit 2 includes a plurality of data storage areas D1–Dn (n is an integral), which store (n–1) control codes corresponding to an instruction code. The data storage areas D1–Dn corresponding to an instruction code form one block. One block is provided for each instruction code.

The high-order address signal S1 represents an address corresponding to the block of beginning or end of the related data storage areas, that is, D1 or Dn. In the case where the high-order address signal S1 indicates the beginning of the related data storage areas, that is, the data storage area D1, data that indicates the number of related control codes (n–1) is stored in the data storage area D1. Alternatively in the case where the high-order address signal S1 indicates the end of the related data storage areas, that is, the data storage area Dn, data which indicates the number of control codes (n–1) is stored in the data storage area Dn. The data indicating the number of the control codes is set, as a preset address value, in the low-order address generator 3. The low-order address generator 3 can be formed by an up counter or a down counter. When the low-order address generator 3 is formed by an up counter, it increments its count value from zero to the preset address value. Each time the up counter 3 counts up, it generates a low-order address signal S2. Alternatively, when a down counter is used, the data indicating the number of the control codes is preset in the down counter. Then the down counter decrements the count value from the preset address value to zero. When the count value of the down counter becomes zero, it stops counting. The internal address generator 4 receives the low-order address signal S2 and the high-order address signal S1, and derives the internal address signal S3 therefrom by which the storage circuit 2 is accessed.

When input data including a specific instruction code is supplied to the high-order address generator 1, the internal address signal S3 is derived from the high-order address signal S1 by the internal address generator 4. The storage circuit 2 is supplied with the internal address signal S3 corresponding to the high-order address signal S1. Thereby, data indicating the number of a series of control codes is read out from the storage circuit 2, and is set, as the preset address value, in the low-order address generator 3 as described previously. The low-order address generator 3 increments or decrements its count value to thereby generate the low-order address signal S2. Then the internal address generator 4 derives the internal address signal S3 from the high-order and low-order address signals S1 and S2. The above-mentioned operation is repeatedly carried out until the indicated number of the control codes has been read from the storage circuit 2. In this manner, it becomes possible to continuously output a series of control codes (extended data) necessary for a procedure for drawing a pattern designated by the input data on a wafer through the exposure device.

Figure 5:
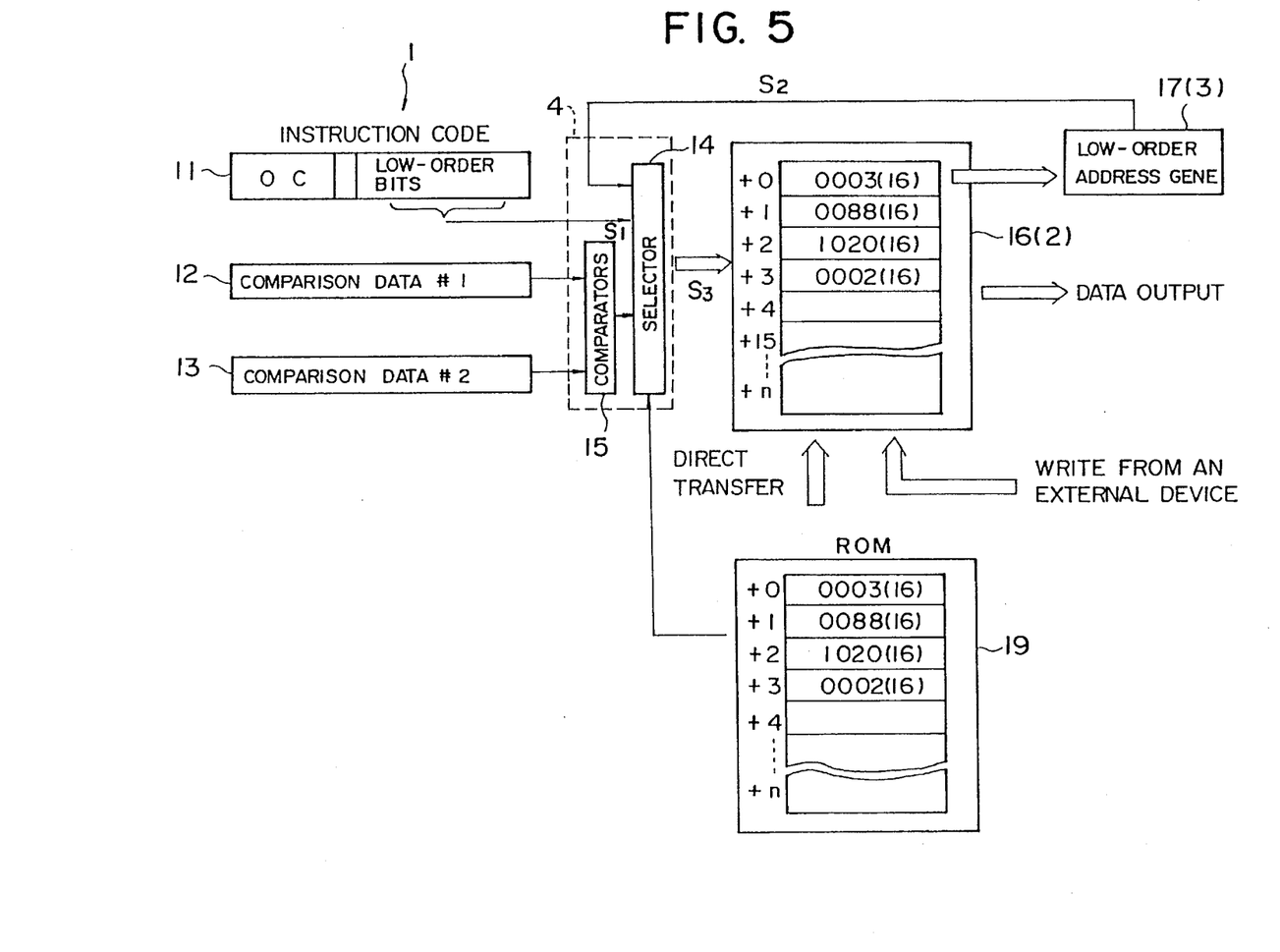
FIG. 5 is a block diagram of a preferred embodiment of the present invention.

A description is given of a preferred embodiment of the present invention with reference to FIGS. 5 through 8. Referring to FIG. 5, there is illustrated a decoder 10 (substituted for the segmented pattern generator 230), which is coupled to the exposure device 260 through the D/A converter 240 and the amplifier 250 shown in FIG. 1. The high-order address generator 1 is made up of a first latch circuit 11, a second latch circuit 12 and a third latch circuit 13. The internal address generator 4 is made up of a memory address decode signal read/write switching circuit (hereinafter simply referred to as a selector) 14, and a group of comparators 15. The storage circuit 2 is formed by a random access memory (hereinafter simply referred to as a RAM). An up counter 17 serves as the low-order address generator 3. Further, the decoder includes a read only memory (hereinafter simply referred to as a ROM) 19.

Figure 6:
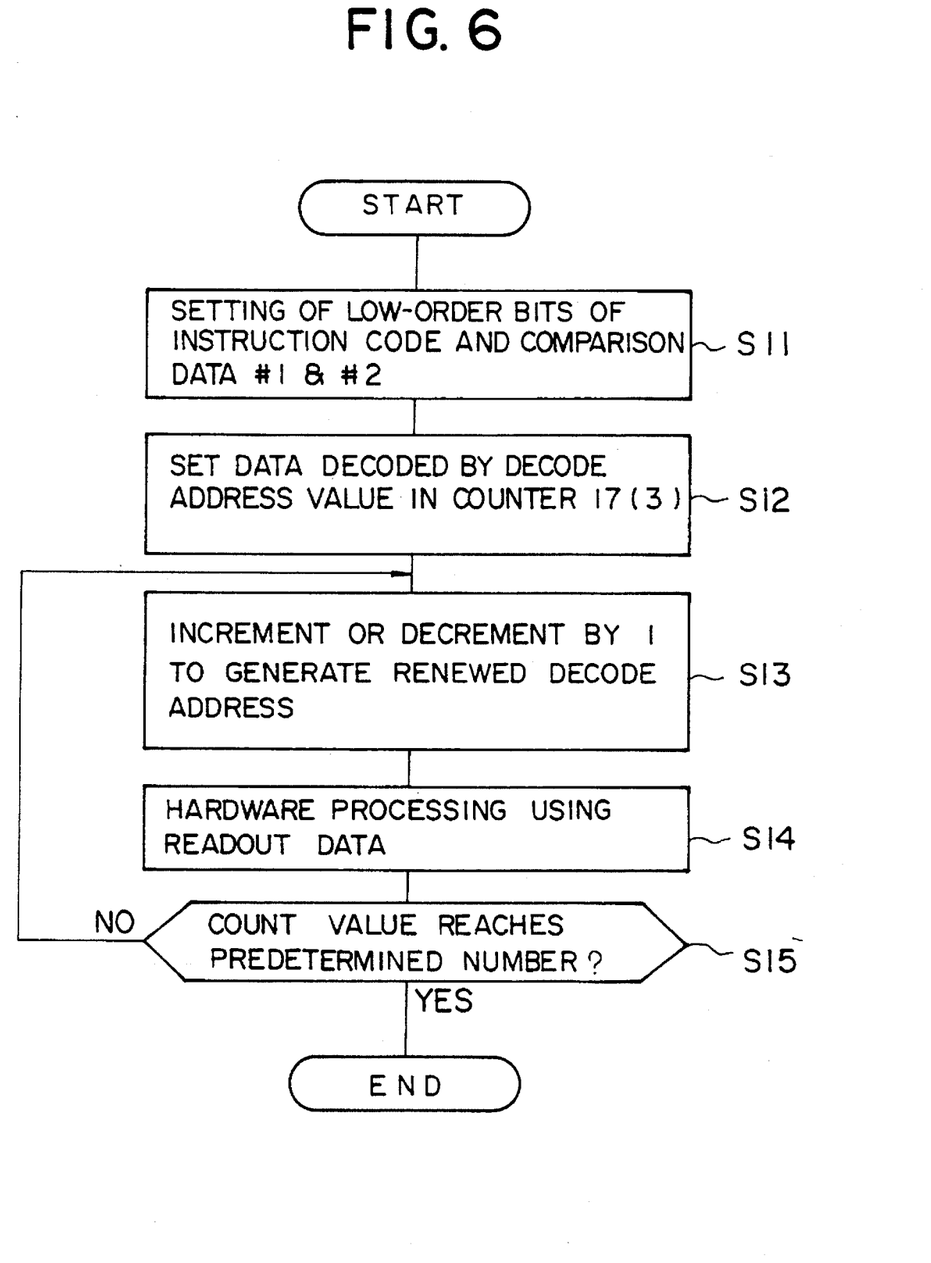
FIG. 6 is a flowchart of a procedure for decoding an instruction code by referring to comparison data according to the present invention.

Referring to FIG. 6, a predetermined number of low-order bits of an instruction code latched in the first latch circuit 11 is supplied, as the aforementioned high-order address signal S1 of the internal address signal S3, to the selector 14 (step S11). On the other hand, comparison data #1 and #2, stored in the latch circuits 12 and 13 respectively, are supplied to the group of the comparators 15. The group of comparators 15 generates some bits serving as middle-order address bits contained in the internal address signal S3. The low-order bits contained in the instruction code and the middle-order bits supplied from the group of comparators 15 are supplied to the selector 14. The low-order address signal S2 supplied from the low-order generator 17 (up counter in this embodiment) is supplied to the selector 14. Initially, the low-order address signal S2 is set to zero. The low-order bits of the instruction code, the bits derived from the comparator group 15 and the low-order address signal S2 are supplied, as the initial internal address signal, to the RAM 16. Thereby, data stored in the data storage area corresponding to the initial internal address signal is read out from the RAM 16, and set in the up counter 17 serving as the low-order address generator (step S12).

It is now assumed that the illustrated control codes are stored beforehand in data storage areas corresponding to the illustrated address values. It is further assumed that the initial internal address signal is '0', and data '0003' (hexadecimal number) is stored in the data storage area corresponding to an address of '0'. As described previously, the data stored in the data storage area indicated by the initial internal address signal represents the number of control codes to be serially read out from the RAM 16. In the illustrated case, the data '0003' is preset in the up counter 17, which is initially set to zero. Then the up counter 17 increments its count value by +1. The incremented count value is supplied, as the low-order address signal S2, to the selector 14 (step S13). The selector 14 selects the low-order address signal S2 together with the low-order bits S1 of the instruction code and the output bits supplied from the group of comparators 15. Thereby, the internal address signal S3 equal to '1' is supplied to the RAM 16, from which a control code of '0088' is read out and supplied to the external hardware device (step S14).

Then the up counter 17 increments the count value by +1, which is supplied to the selector 14. Then the aforementioned procedure in steps S13 and S14 is executed in the same manner, so that a control code '1020' is read out from the RAM 16. A control code '0002' is read out from the RAM 16 in the same manner.

Figure 7A:
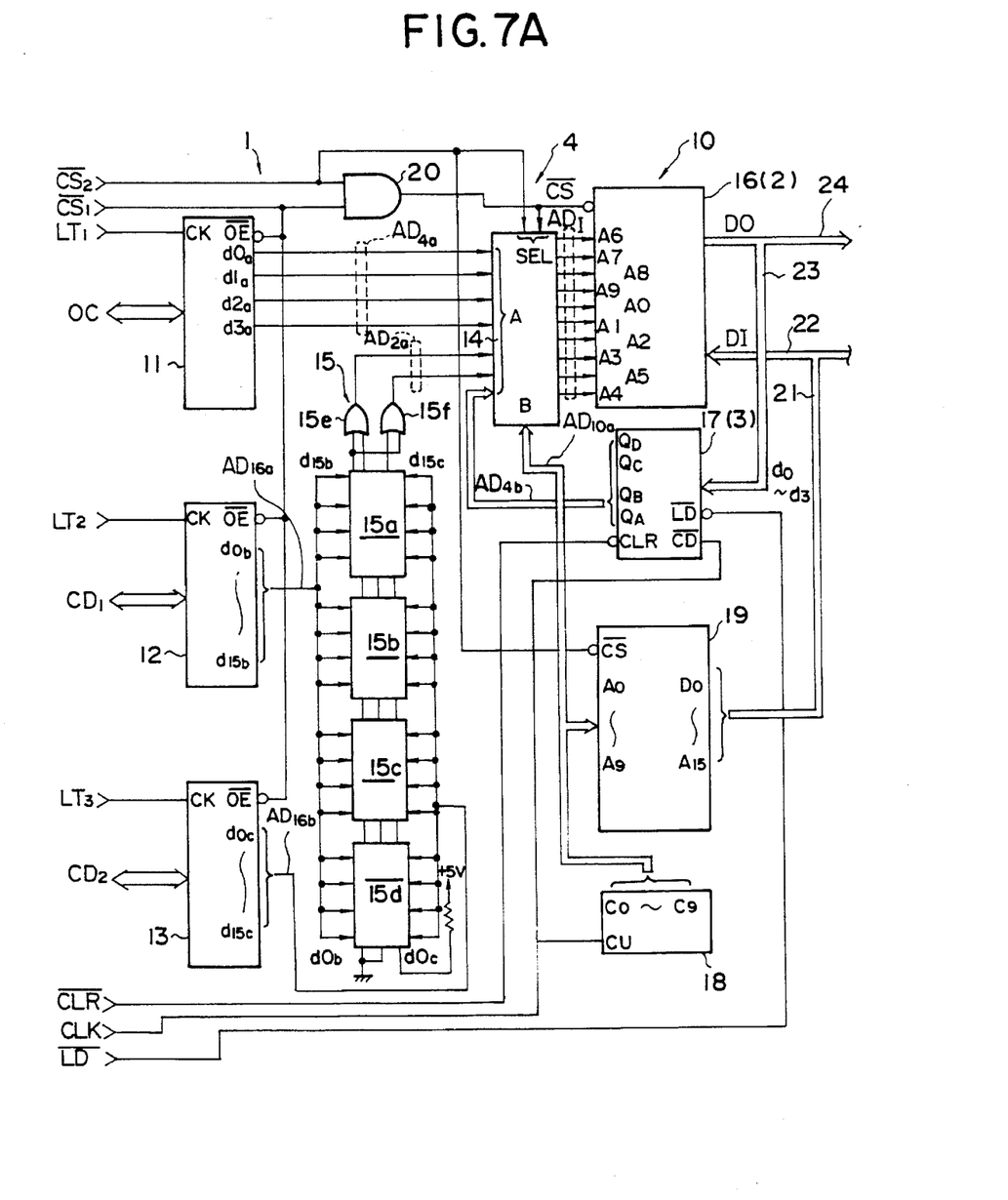
FIGS. 7A and 7B are circuit diagrams of a detailed configuration of the embodiment shown in FIG. 6.
Figure 7B:
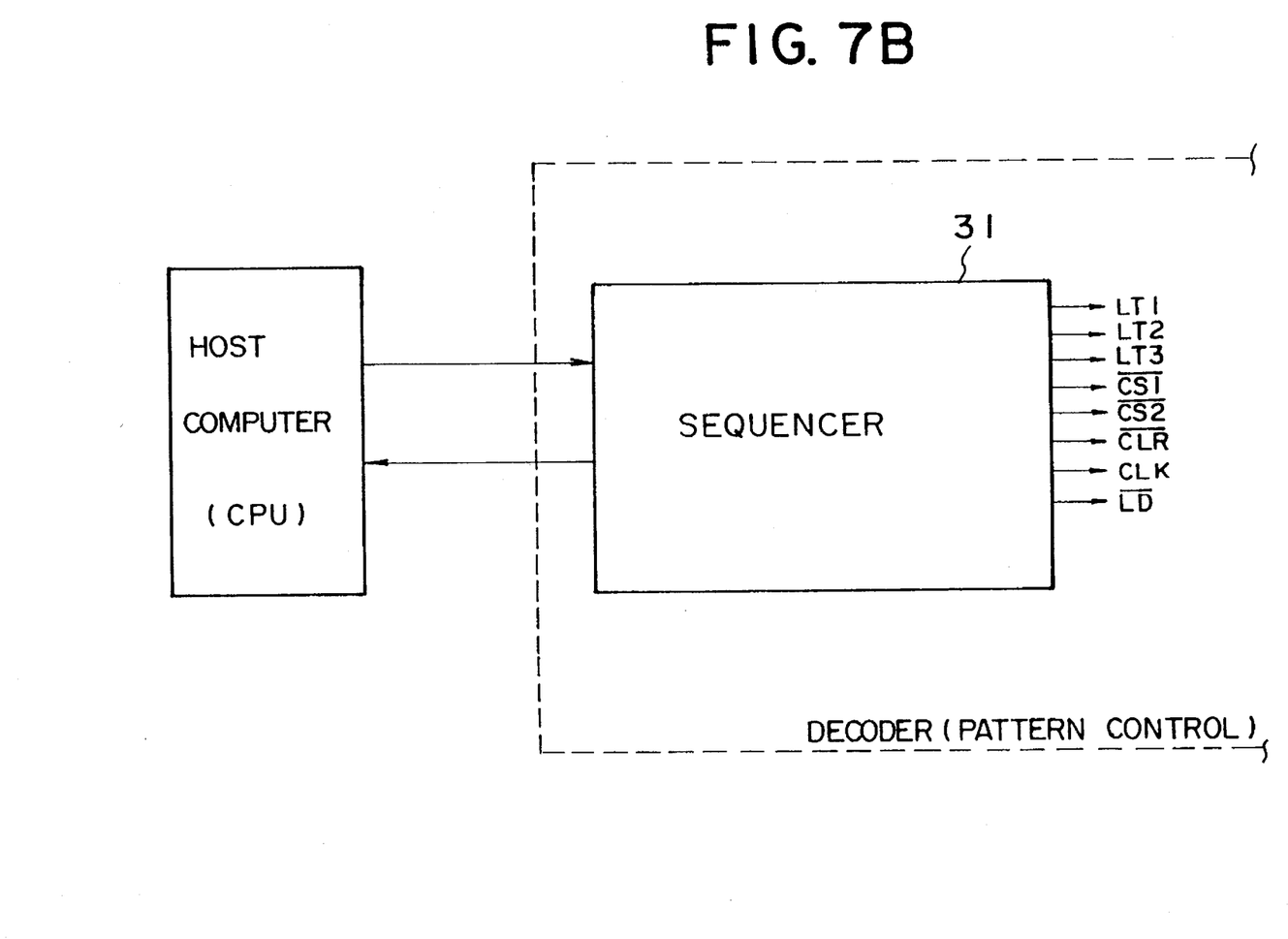
Figure 8:
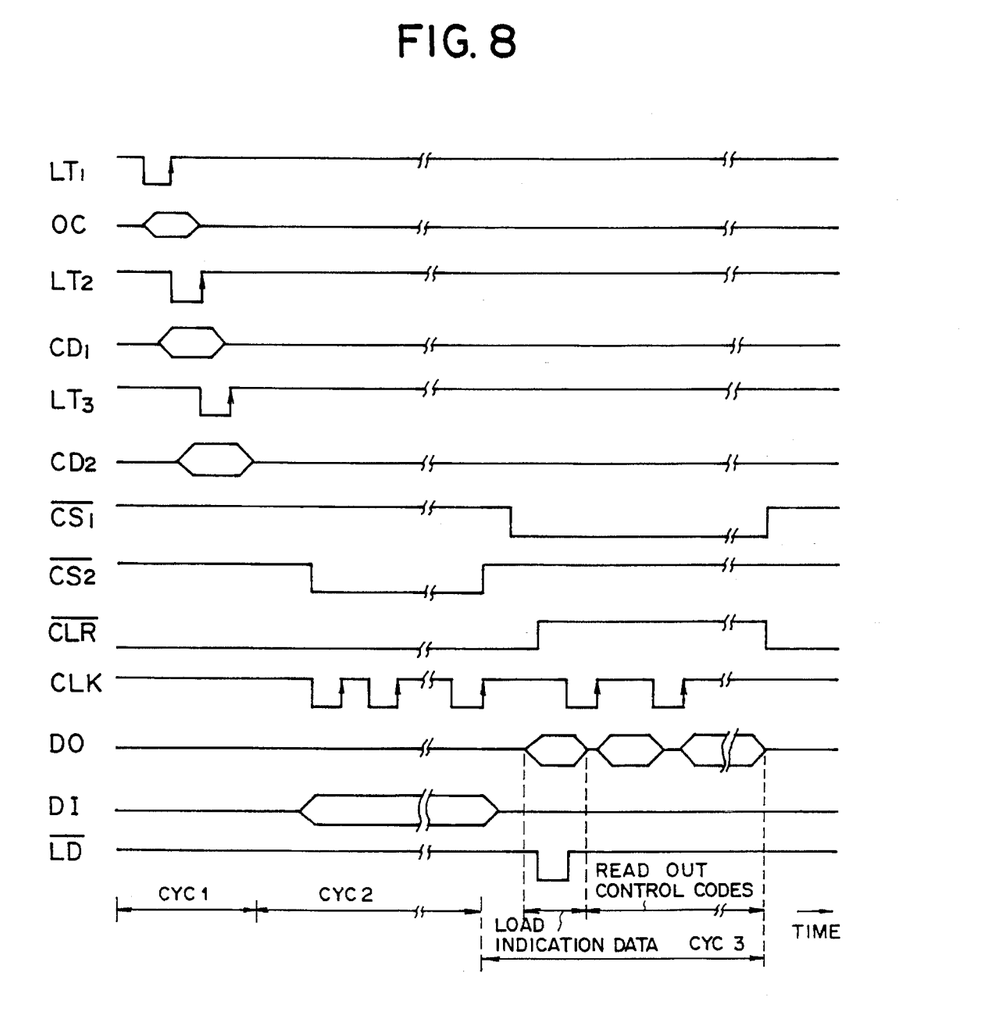
FIG. 8 is a waveform diagrams of signals observed at parts of the configuration shown in FIGS. 7A and 7B.

When the count value of the up counter 17 reaches '3', the up counter 17 stops counting (step S15). In this manner, a series of control codes (extended data) is continuously derived from a single instruction code by referring to the comparison data #1 and #2. FIGS. 7A and 7B are circuit diagrams of the decoder shown in FIG. 5. Referring to FIG. 8 in addition to FIGS. 7A and 7B, the first latch circuit 11 latches an instruction code labeled OC supplied from the data management circuit 220 (FIG. 1) in synchronism with a rise of a latch control signal LT1, which is generated by a sequencer 31 (FIG. 7B). The first latch circuit 11 outputs a four-bit address data AD4a. The second latch circuit 12 latches comparison data #1 labeled CD1 supplied from the management circuit 220 in synchronism with a rise of a latch control signal LT2. The second latch circuit 12 outputs 16-bit address data AD16a. The third latch circuit 13 latches comparison data #2 labeled CD2 supplied from the management circuit 220 in synchronism with a rise of a latch control signal LT3. The third latch circuit 13 outputs 16-bit address data AD16b. The group of comparators 15 is made up of four comparators 15a, 15b, 15c and 15d, and two OR gates 15e and 15f. The comparator group 15 compares the address data AD16a and AD16b, and generates two-bit address data AD2a dependent on the comparison result. The selector 14 receives the address data AD4a and AD2a and four-bit address data AD4b (will be described later) through A-input group terminals thereof. The address data passing through the A-input group terminals consists of 10 bits in total. Further, the selector 14 receives 10-bit address data AD10a (which will be described later) through B-input group terminals thereof. The selector 14 selects the address data relating to the A-input group or the B-input group in accordance with a select signal applied to select signal terminals. In a RAM write cycle CYC2 (FIG. 8) which will be described later, the selector 14 selects the B-input group. Then the selector 14 outputs 10-bit internal address data $AD_I$.

The RAM 16 serving as the storage circuit 2 is accessed by an address consisting of 10 bits, A0–A9. In the RAM write cycle CYC2, data supplied from the ROM 19 through a data bus 21 is written into the RAM 16. Alternatively, in the RAM write cycle CYC2, data supplied from the host computer 200 shown in FIG. 1 through a data bus 22 is written into the RAM 16. In the ROM 19, data is written beforehand in a predetermined format. Data stored in the ROM 19 is a series of control codes which correspond to an instruction code OC and can be executed by the exposure device 260 (FIG. 1). A series of control codes forms one block. The first data or the last data of the block represents the number of the control codes of the block. One block of control codes is provided for each of the different instruction codes. Hereinafter, only one block of control codes is stored in the RAM 16 for the sake of simplicity.

An address counter 18 generates the aforementioned 10-bit address data AD10a, which is, for example, incremented from zero in the RAM write cycle CYC2. The control codes of one block stored in the ROM 19 are sequentially accessed by the address data AD10a, and are transferred to the RAM 16 and then written therein. The preset address value which is the data indicating the number of control codes of one block is loaded in the up counter 17 from the RAM 16 through a data bus 23. As described previously, the initial address value is data which is positioned in the beginning or the end of one block. The up counter 17 generates the four-bit address data AD4b by counting up its count value until it reaches the loaded preset address value. The control codes are serially read out from the RAM 16 through a data bus 24, and supplied to an external hardware device (not shown) through an output port (not shown).

Chip select signals $\overline{CS1}$ and $\overline{CS2}$, which are generated by the sequencer 31 shown in FIG. 7B, are supplied to an AND gate 20, which generates a chip select signal $\overline{CS}$ applied to the RAM 16. The chip select signal $\overline{CS1}$ is supplied to the first, second and third latch circuits 11, 12 and 13. The chip select signal $\overline{CS2}$ is supplied to the selector 14 and the ROM 19. Further, the sequencer 31 generates a clear signal CLR supplied to the up counter 17, a load signal $\overline{LD}$ supplied to the up counter 17, and a clock signal CLK supplied to the up counter 17 and the address counter 18.

A description is given of an operation of the embodiment. As indicated in FIG. 8, a procedure for decoding the instruction code together with the comparison data #1 and #2 to thereby generate a series of control codes (extended data) consists of three cycles, that is, a data setting cycle CYC1, RAM write cycle CYC2 and control code readout cycle CYC3.

In the data setting cycle CYC1, the instruction code OC, and the comparison data CD1 and CD2 are latched in the first, second and third latch circuits 11, 12 and 13 in synchronism with the rise of latch control signals LT1, LT2 and LT3, respectively. The sequencer 31 terminates the data setting cycle CYC1 when a predetermined time has passed.

In the RAM write cycle CYC2, control codes of a block are written into the RAM 16. As described previously, the control codes to be written are supplied from the ROM 19 or the host computer 210 (FIG. 1). The following description relates to the case where the control codes stored in the ROM 19 are transferred to the RAM 16 and then written therein. It is now assumed that as shown in FIG. 5, number indicating data '0003', and control codes '0088', '1020' and '0002' are stored in data storage areas corresponding to addresses '0', '1', '2' and '3', respectively. The data '0003' indicates the number of related control codes which form one block. In the RAM write cycle CYC2, the chip select signal $\overline{CS2}$ supplied from the sequencer 31 is changed to a low level, and thus the ROM 19 is selected. In synchronism with the fall of the chip select signal $\overline{CS2}$, the clock signal CLK is made active. Then the control codes and the data indicating the number of the control codes are serially read out from the ROM 19 in accordance with the address data AD10a generated by the address counter 18, and are transferred, as the data DI, to the RAM 16 through the data bus 21, and then written therein. During the RAM write cycle CYC2, the RAM 16 is selected by the chip select signal CS supplied from the AND gate 20, and the selector 14 selects the B-input group. Thus, the address data AD10a supplied from the address counter 18 passes through the selector 14 and is then supplied to the RAM 16. In the above-mentioned manner, as shown in FIG. 5, the contents of the ROM 19 are written into the RAM 16 as they are. The sequencer 31 terminates the RAM write cycle CYC2 when a predetermined time has passed.

At the commencement of the control code readout cycle CYC3, the sequencer 31 makes the chip select signal $\overline{CS2}$ inactive and then makes the chip select signal $\overline{CS1}$ active. Thus the selector 14 selects the A-input group. Thereafter, the sequencer 31 makes the clear signal $\overline{CLR}$ inactive by setting the same to a high level. At this time, the up counter 17 indicates its count value equal to zero. As described previously, the selector 14 selects the A-input group in the control code readout cycle CYC3. The A-input group terminals are supplied with the address data AD4a, AD2a and AD4b. The address data AD4a relates to the instruction code OC, the address data AD2a relates to the comparison results for the comparison data CD1 and CD2, and the address data AD4b relates to the count value derived from the up counter 17.

In the illustrated configuration, the address data AD4a, AD2a and AD4b form high-order address bits, middle-order address bits, and low-order address bits, respectively. Now, the address data AD4b is zero and thus the RAM 16 is accessed by the address data AD4a and AD2a. When the address data AD4a and AD2a obtained at this time is designed to correspond to address '0' of the RAM 16, data '0003' stored in the storage area corresponding to address '0' is read out from the RAM16. That is, data indicating the number of the control codes is output to the data bus 23, and is loaded in the address 17 in synchronism with the load signal $\overline{LD}$ so that the preset address value is written therein. After that, the counter 17 increments the count value one by one in synchronism with the clock signal CLK until the count value becomes equal to the preset address value which indicates the number of the control codes. Thereby, the address data AD4b is renewed one by one, and control codes '0088', '1020' and '0002' are serially read out from the RAM 16 and supplied to the data bus 24. For example, control codes '0088', '1020' and '0002' correspond to control codes #3, #1 and #6 shown in FIG. 2, respectively.

The features of the aforementioned embodiment of the present invention are summerized below. The address to be supplied to the RAM 16 consists of the address data AD4a which corresponds to the instruction code OC and forms four high-order address bits thereof, the address data AD2a which corresponds to the comparison result obtained by comparison between the comparison data CD1 and CD2 and form two middle-order address bits, and the address data AD4b which is in turn renewed and forms four low-order address bits. A plurality of control codes corresponding to a specific instruction code are arranged in the order of the addresses and stored in the RAM 16. The data corresponding to the first or last address value indicates the number of control codes to be serially read out from the RAM 16. Once the instruction code OC and the comparison data CD1 and CD2 are supplied to the decoder, a series of control codes stored in the RAM 16 is serially read out therefrom in accordance with the address consisting of the address data AD4a, AD2a and AD4b. With the above-mentioned structure, it becomes possible to increase the time it takes to decode the input data including the instruction code OC, and the comparison data CD1 and CD2. Further, the present invention has a high flexibility in operation since a series of control codes (extended data) to be written set in the RAM 16 may be supplied from the ROM 19 or the host computer 200.

When the count value in the up counter 17 has reached the preset address value, the counter 17 lets the sequencer 31 (FIG. 7B) know the end of counting through a signal line (not shown for the sake of simplicity). Thereby, the sequencer 31 clears the up counter 17 by setting the clear signal $\overline{CLR}$ to the low level, and makes the chip select signal $\overline{CS1}$ inactive.

Each of the first, second and third latch circuits 11, 12 and 13 is formed by "F573", and each of the comparators 15a–15d is formed by "S85", for example. Further, the up counter 17 is formed by "F193", and the RAM 16 is formed by "81C86-55" for example. In this case, the data setting cycle CYC1 takes 200 ns (minimum), and the control code readout cycle CYC3 takes 220 ns (minimum). If a high-speed microprocessor having a one-cycle of 100 ns carries out the same process, it takes 3.6 µs (minimum) to obtain the same series of control codes (extended data). It follows that the configuration shown in FIGS. 7A and 7B operates 12 times faster than the conventional configuration shown in FIG. 1.

Figure 9:
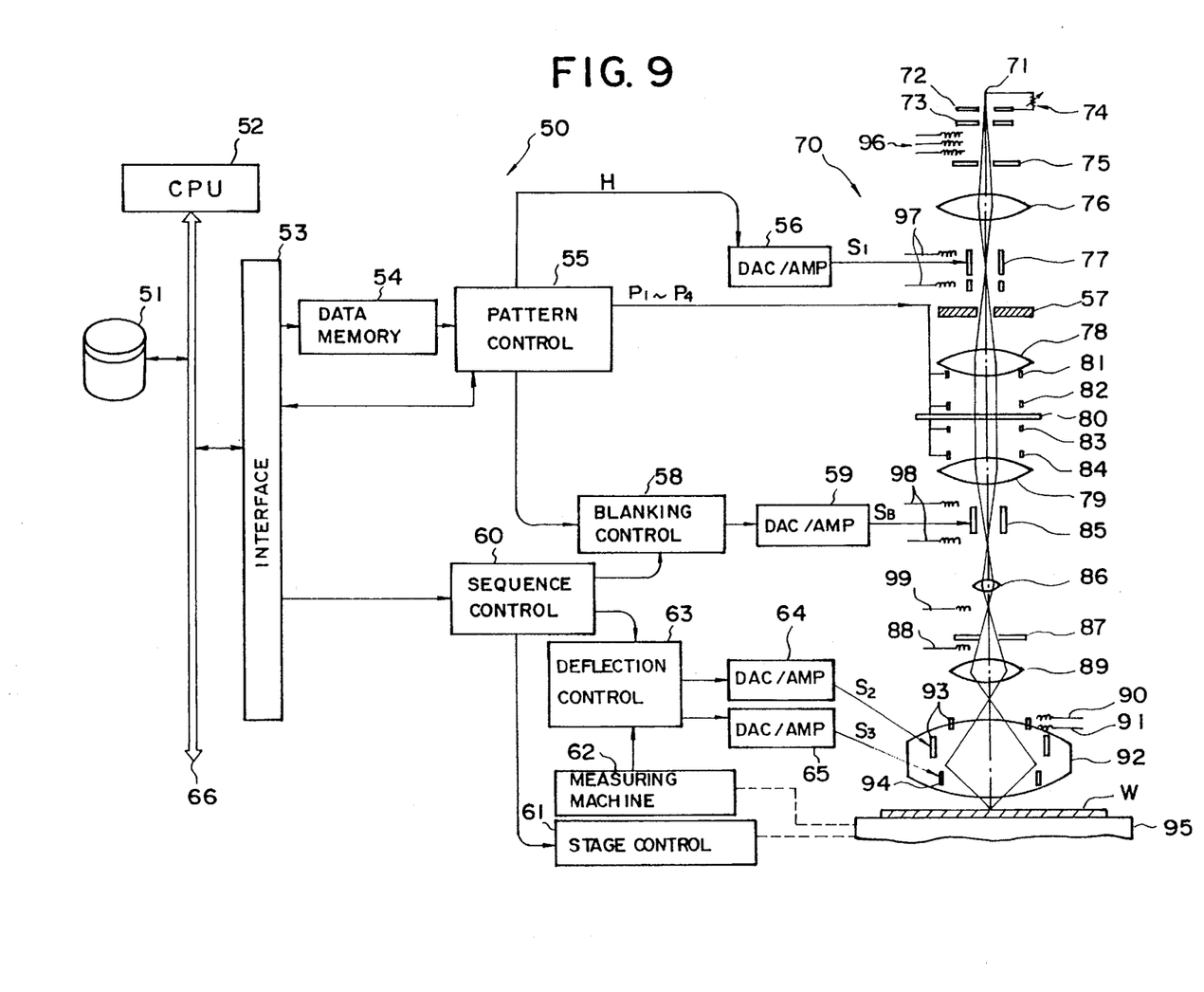
FIG. 9 is a diagram of an electron beam exposure apparatus with the present invention incorporated.

FIG. 9 is a diagram of an electron beam exposure apparatus embodying the decoder according to the present invention. Referring to FIG. 9, the illustrated electron beam exposure apparatus consists of an exposure controller 50 and an electron beam exposure device 70. The exposure controller 50 includes a data memory 54 and a pattern controller 55. The data memory 54 corresponds to the data management device 220 shown in FIG. 1. The pattern controller 55 includes the decoder shown in FIGS. 7A and 7B according to the embodiment of the present invention.

The exposure device 70 is configured as follows. A charged electron beam generating source 74 consists of a cathode electrode 71, a grid electrode 72 and an anode electrode 73. A first slit 75 shapes the charged electron beam into a rectangular shape. A first lens 76 converges the shaped beam. A slit deflector 77 corrects and deflects the converged beam in accordance to a correction/deflection signal S1. A second slit 57 is interposed between the slit deflector 77 and a second lens 78. A third lens 79 is arranged so as to be opposite to the second lens 78 through a third slit 80. Position data signals P1–P4 are supplied to corresponding deflectors 81–84. A blanking gate 85 interrupts or passes the beam in response to a blanking signal $S_B$. A third lens 86 is provided between the blanking gate 85 and an aperture 87. A fourth lens 89 is provided so as to face the third lens 86 through the aperture 87. Further, the exposure device 70 includes a focus coil 90, a sting coil 91, and a fifth lens 92. Furthermore, the exposure device 70 includes a main deflector coil 93 and a sub deflector coil 94 which function to position the beam on a wafer W in an exposure position deciding signals S2 and S3, a stage 95 movable in directions X, Y, and four alignment coils 96–99.

The exposure controller 50 is configured as follows. A recording device 51 such as a magnetic drum device stores designed data relating to an integrated circuit device which is to be formed on the wafer W. A central processing unit (CPU) 52 serves as a host computer and controls the entire electron beam exposure apparatus. An interface circuit 53 is connected to a bus 66 and passes a variety of information, such as exposure pattern information including instruction codes or exposure position information including comparison data. The data memory 54 serving as the aforementioned data management device 220 (FIG. 1) stores the exposure pattern information and exposure position information. The pattern controller 55 includes the aforementioned decoder shown in FIGS. 7A and 7B. The pattern controller 55 generates correction data H, pattern data signals P1–P4 and a control signal for controlling the blanking gate 85. These data are generated using the control codes read out from the RAM 16 (FIG. 7A). An amplifier circuit (DAC/AMP) 56, which includes a digital-to-analog converter and an amplifier, generates the correction/deflection signal S1 from the correction data H. A blanking control circuit 58 generates a blanking signal from the control signal supplied from the exposure controller 55 and a signal supplied from a sequence controller 60. The control signal derived from the blanking control circuit 58 passes through an amplifier circuit (DAC/AMP) 59 including a digital-to-analog converter and an amplifier to become the aforementioned blanking signal $S_B$. The sequence controller 60 controls an exposure sequence on the basis of the exposure position information supplied from the interface circuit 53, and generates sequence control signals, which are supplied to the blanking control circuit 58, a stage controller 61 and a deflection control circuit 63. In accordance with the sequence control signal, the stage controller 61 moves a stage 95 on which the wafer W is placed. A laser interferometric measuring machine 62 detects the current position of the stage 95. The deflection control circuit 63 calculates data indicating exposure position on the wafer W on the basis of the sequence signal supplied from the sequence controller 60 and the detected position of the stage 95.

In the aforementioned embodiment, comparison data are not limited to the comparison data CD1 and CD2, and an arbitrary number of sets of comparison data can be used. The decoder according to the present invention may be applied to another part of the electron beam exposure apparatus, such as the sequence controller 60. In this application, the sequence controller 60 includes a decoder having the same structure shown in FIGS. 7A and 7B, and a sequence of steps of exposure is stored in the RAM 16.

What is claimed is:

1. A decoder, comprising:

a storage unit having a storage block related to an instruction code and sequentially storing control codes corresponding to the instruction code and indication data indicating a number of the control codes, the indication data being stored in a predetermined portion of the storage block; and address generating means for generating an address signal specifying the indication data stored in the predetermined portion in response to receipt of input data including the instruction code and then sequentially specifying the control codes by one of incrementing and decrementing an address represented by the address signal, the control codes being serially read out from said storage unit in response to receipt of the instruction code, said input data including data representing a shape of a pattern to be drawn on a wafer by an electron beam exposure apparatus, information on a starting point on said wafer from which exposure is started and information on a size of said pattern to be exposed.

2. A decoder as claimed in claim 1, wherein the control codes represent segmented patterns collectively forming the shape of the pattern to be drawn.

3. A decoder comprising:

a storage unit having storage blocks respectively related to instruction codes, each of the storage blocks sequentially storing a plurality of control codes corresponding to one of the instruction codes and indication data indicating a number of the control codes corresponding to each of the instruction codes, the indication data being stored in a predetermined portion of each storage block; and address generating means for generating an address signal specifying the indication data stored in the predetermined portion in response to receipt of input data including a corresponding instruction code and sequentially specifying the control codes for the corresponding instruction code by one of incrementing and decrementing an address represented by the address signal, the control codes for the corresponding instruction code being serially read out from said storage unit in response to receipt of the corresponding instruction code, said input data including data representing a shape of a pattern to be drawn on a wafer by an electron beam exposure apparatus, information on a starting point on said wafer from which exposure is started and information on a size of said pattern to be exposed.

4. A decoder as claimed in claim 3, wherein the control codes for the corresponding instruction code represent segmented patterns forming the shape of the pattern to be drawn.

5. A decoding method comprising the steps of:

generating a first address from input data including an instruction code, said input data including comparison data which includes information designating a shape of a pattern to be exposed on a wafer by an electron beam exposure apparatus, information on a starting point on said wafer from which exposure is started and information on a size of said pattern to be exposed;

storing, in storage areas of a first storage means, a plurality of control codes corresponding to said instruction code and indication data indicating a number of said plurality of control codes, said indication data being stored in one of beginning and end storage areas among said storage areas, said one of the beginning and end storage areas being indicated by said first address;

generating, according to said instruction code received from said first storage means, successive second addresses equal in number to said number of control codes as indicated by said indication data; and in response to said first and second addresses, generating internal addresses to be supplied to said first storage means by combining said received first and second addresses, said plurality of control codes being serially read out from said first storage means in accordance with said internal addresses.

6. A decoding method as claimed in claim 5, said decoding method further comprising the steps of:

generating a high-order part of each of said internal addresses from a low-order part of said instruction code, and generating a middle-order part of each of said internal addresses from said comparison data and combining same with said low-order part of said instruction code, thereby to form said first address from said high-order part and said middle-order part.

7. A decoding method as claimed in claim 5, further comprising the step of:

storing said indication data and said plurality of control codes in second storage means, said indication data and said plurality of control codes being read out from said second storage means and written in corresponding storage areas in said first storage means before said input data is used for generating said first address.

8. A decoding method comprising the steps of:

generating a first address from input data including an instruction code, said input data including comparison data which includes information designating a shape of a pattern to be exposed on a wafer by an electron beam exposure apparatus, information on a starting point on said wafer from which exposure is started and information on a size of said pattern to be exposed;

storing, in a first storage means having storage areas, a plurality of control codes corresponding to said instruction code and indication data indicating a number of said plurality of control codes, said indication data being stored in one of beginning and end storage areas among said storage areas, said one of the beginning and end storage areas being indicated by said first address;

storing, in a second storage means having storage areas and being coupled to said first storage means, said plurality of control codes and said indication data to be transferred to said first storage means;

generating, according to said instruction code, successive second addresses equal in number to said number of control codes indicated by said indication data;

generating first internal addresses to be supplied to said first storage means by combining said first and second addresses;

generating second internal addresses to be supplied to said first and second storage means; and selecting one of said first and second internal addresses as a selected internal address to be supplied to said first storage means, said plurality of control codes being serially read out from said first storage means in accordance with said selected internal address.

9. A decoding method as claimed in claim 8 further comprising the steps of:

generating a high-order part of said first internal addresses from a low-order part of said instruction code; and generating a middle-order part of said first internal addresses from said comparison data so that said first address is composed of said high-order part and said middle-order part.

10. A decoding method as claimed in claim 8, wherein said storage areas of each of said first and second storage means are arranged so as to correspond to continuous values of each of said first and second internal addresses.

11. A decoding method as claimed in claim 10, wherein the control codes represent segmented patterns collectively forming the shape of the pattern to be drawn.

12. A decoder as claimed in claim 11, wherein the control codes for the corresponding instruction code represent segmented patterns forming the shape of the pattern to be drawn.

13. A decoder comprising:

first address generating means for generating a first address from input data including an instruction code;

first storage means, having a plurality of groups of storage areas, for storing a plurality of sets of control codes respectively corresponding to a plurality of instruction codes, and indication data related to, and indicating a number of control codes of, each set, said indication data being stored in one of a beginning storage area and an end storage area in each of the groups of storage areas, said one of the beginning and end storage areas, in each of the groups of storage areas, being indicated by said first address generated by said first address generating means;

second address generating means, coupled to said first storage means, for generating successive second addresses of a number equal to the number of control codes of one of the sets indicated by the indication data related to the instruction code included in said input data; and internal address generation means, coupled to said first and second address generating means, for receiving the respective first and second addresses therefrom, combining said received first and second addresses and thereby generating internal addresses to be supplied to said first storage means, and said one of the sets of control codes being serially read from said first storage means in accordance with said internal addresses, said input data including comparison data includes information designating a shape of a pattern to be exposed on a wafer by an electron beam exposure apparatus, information on a starting point on said wafer from which exposure is started and information on a size of said pattern to be exposed.

14. A decoder comprising:

first address generating means for generating a first address from input data including an instruction code;

first storage means, having storage areas, for storing a set of control codes corresponding to said instruction code and indication data related to, and indicating a number of said control codes of, said set of control codes in said storage areas, said indication data being stored in one of a beginning storage area and an end storage area of a corresponding set of said storage areas, said one of the beginning and end storage areas being indicated by said first address generated by said first address generating means;

second address generating means, coupled to said first storage means, for generating successive second addresses, of a number equal to said number of said control codes of said set thereof as indicated by said indication data; and internal address generating means, coupled to said first and second address generating means, for receiving the respective first and second addresses therefrom and generating internal addresses to be supplied to a said first storage means, by combining said received first and second addresses, said set of control codes being serially read out from said first storage means in accordance with said internal addresses, said input data including comparison data which includes information designating a shape of a pattern to be exposed on a wafer by an electron beam exposure apparatus, information on a starting point on said wafer from which exposure is started and information on a size of said pattern to be exposed.

15. A decoder as claimed in claim 14, wherein said first address forms a high-order part of each of said internal addresses, and each of said second addresses forms a low-order part of one of said internal addresses.

16. A decoder as claimed in claim 14, wherein said first address generating means generates said first address from a low-order part of said instruction code.

17. A decoder as claimed in claim 14, wherein said first address generating means comprises:

first means for generating a high-order part of each of said internal addresses from a low-order part of said instruction code, and second means for generating a middle-order part of each of said internal addresses from said comparison data and combining said with said generated high-order part, thereby to form said high-order part and said middle-order part of said first address.

18. A decoder as claimed in claim 14, wherein said storage areas of said first storage means are arranged in said first storage means so as to correspond to consecutive values of said internal addresses.

19. A decoder as claimed in claim 14, wherein said indication data and said plurality of control codes are supplied from an external device and written in corresponding storage areas in said first storage means before said input data is supplied to said first address generating means.

20. A decoder as claimed in claim 14, further comprising:

second storage means for storing said indication data and said set of control codes, said indication data and said set of control codes being read out from said second storage means and written in said corresponding set of said storage areas in said first storage means before said input data is supplied to said first address generating means.

21. A decoder comprising:

first address generating means for generating a first address from input data including an instruction code;

first storage means, having storage areas, for storing a set of control codes corresponding to said instruction code and indication data indicating a number of said control codes of said set thereof in said storage areas, said indication data being stored in one of a beginning storage area and an end storage area of said storage areas, of a set of said storage areas corresponding to said set of control codes, said one of the beginning and end storage areas being indicated by said first address supplied from said first address generating means;

second storage means, having storage areas and being coupled to said first storage means, for storing said plurality of control codes and said indication data to be transferred to said first storage means;

second address generating means, coupled to said first storage means, for generating, according to said instruction code, successive second addresses equal in number to said number of said set of control codes indicated by said indication data;

first internal address generating means for generating first internal addresses to be supplied to said first storage means by combining said first and second addresses;

second internal address generating means for generating second internal addresses to be supplied to said first and second storage means; and selecting means for selecting one of said first and second internal addresses as a selected internal address to be supplied to said first storage means, said plurality of control codes being serially read out from said first storage means in accordance with said selected internal address, said input data including comparison data which includes information designating a shape of a pattern to be exposed on a wafer by an electron beam exposure apparatus, information on a starting point on said wafer from which exposure is started and information on a size of said pattern to be exposed.

22. A decoder as claimed in claim 21, wherein said decoder has a write cycle in which said selecting means passes one of said second internal addresses and supplies said first storage means with one of said second internal addresses, and said plurality of control codes and said indication data are read out from said second storage means in accordance with one of said second internal addresses and are written into said first storage means in accordance with one of said second internal addresses, and a read cycle in which said selecting mean passes one of said first internal addresses so that said plurality of control codes are serially read out from said first storage means in accordance with one of said first internal addresses.

23. A decoder as claimed in claim 22, wherein the value of each of said first internal addresses equals one of said second internal addresses for each of said plurality of control codes, and each of said first internal addresses equals one of said second internal addresses for said indication data.

24. A decoder as claimed in claim 21, wherein said first address forms a high-order part of said first internal address, and each of said second addresses forms a low-order part of one of said first internal addresses.

25. A decoder as claimed in claim 21, wherein said first address generating means generates said first address from a low-order part of said instruction code.

26. A decoder as claimed in claim 21, wherein
said first address generating means comprises:
   first means for generating a high-order part of said first internal addresses from a low-order part of said instruction code, and
   second means for generating a middle-order part of said first internal addresses from said comparison data so that said first address is composed of said high-order part and said middle-order part.

27. A decoder as claimed in claim 26, wherein:
said comparison data comprises first comparison data and second comparison data, and
said second means for generating includes a comparator which compares said first and second comparison data and produces a comparison result.

28. A decoder as claimed in claim 27, wherein said middle-order part of each of said first internal addresses is based on comparison results supplied from said comparator.

29. A decoder as claimed in claim 21, wherein said storage areas of each of said first and second storage means are arranged so as to correspond to successive values of each of said first and second internal addresses.

30. A decoder as claimed in claim 21, wherein said first storage means includes a random access memory, and said second storage means includes a read only memory.

31. A decoder as claimed in claim 21, wherein said first address generating means comprises latch means for latching a low-order part of said instruction code.

* * * * *